(12) United States Patent
Ingram et al.

(10) Patent No.: US 12,391,219 B1
(45) Date of Patent: Aug. 19, 2025

(54) WIPER TIMING AND GEOMETRY TO MINIMIZE SENSOR OCCLUSION

(71) Applicant: Waymo LLC, Mountain View, CA (US)

(72) Inventors: Benjamin Ingram, Santa Clara, CA (US); Eric Schmidt, Los Altos, CA (US); Seth Gilbertson, Dublin, CA (US); Nicholas Wiles, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/230,002

(22) Filed: Aug. 3, 2023

Related U.S. Application Data

(60) Continuation of application No. 17/953,961, filed on Sep. 27, 2022, now Pat. No. 11,752,981, which is a division of application No. 16/781,126, filed on Feb. 4, 2020, now Pat. No. 11,485,328, which is a continuation of application No. 15/784,944, filed on Oct. 16, 2017, now Pat. No. 10,589,726.

(51) Int. Cl.
| | |
|---|---|
| *B60S 1/52* | (2006.01) |
| *B60S 1/56* | (2006.01) |
| *G01S 13/93* | (2020.01) |
| *B60S 1/44* | (2006.01) |
| *G01S 7/02* | (2006.01) |

(52) U.S. Cl.
CPC .............. *B60S 1/566* (2013.01); *G01S 13/93* (2013.01); *B60S 1/44* (2013.01); *B60S 1/52* (2013.01); *G01S 7/027* (2021.05)

(58) Field of Classification Search
CPC .... B60S 1/52; B60S 1/566; B60S 1/56; B60S 1/44
See application file for complete search history.

(56) References Cited

U.S. PATENT DOCUMENTS

| | | | | |
|---|---|---|---|---|
| 7,420,346 B2 * | 9/2008 | Metz | ......................... | B60S 1/18 318/443 |
| 11,167,726 B2 * | 11/2021 | Hu | ............................ | B60S 1/08 |
| 11,535,204 B1 * | 12/2022 | Lombrozo | ............. | B08B 1/143 |
| 11,752,981 B1 * | 9/2023 | Ingram | ................... | G01S 7/497 15/444 |
| 2005/0217699 A1 * | 10/2005 | Murakami | ................ | B60S 1/44 15/250.3 |

* cited by examiner

*Primary Examiner* — Michael D Jennings
(74) *Attorney, Agent, or Firm* — Botos Churchill IP Law

(57) ABSTRACT

A system for clearing a sensor cover is described. The system includes a first sensor that rotates within a sensor cover, a plurality of second sensors that are fixed relative to the sensor cover, a first wiper that is configured to clear the sensor cover of debris, and a motor. The motor is capable of rotating the first wiper in a first direction at a first predetermined rotation rate defined at least in part by a second predetermined rotation rate of the first sensor.

18 Claims, 12 Drawing Sheets

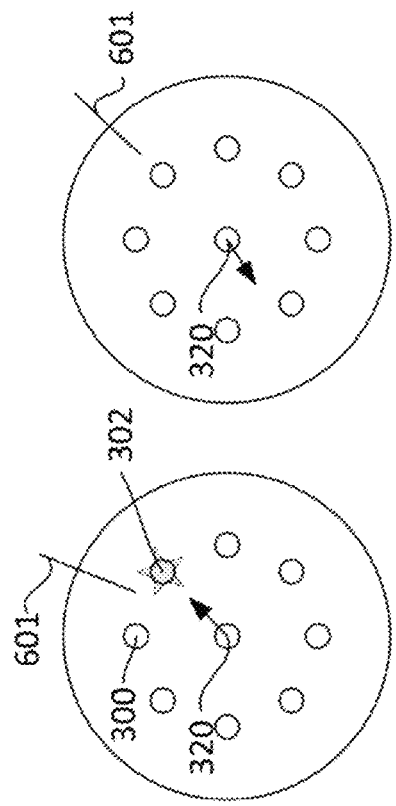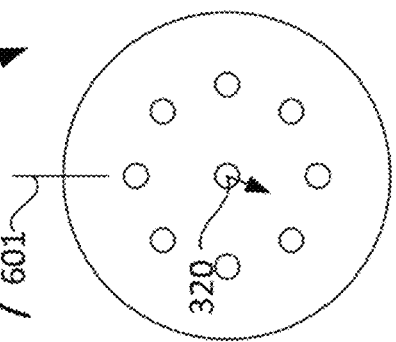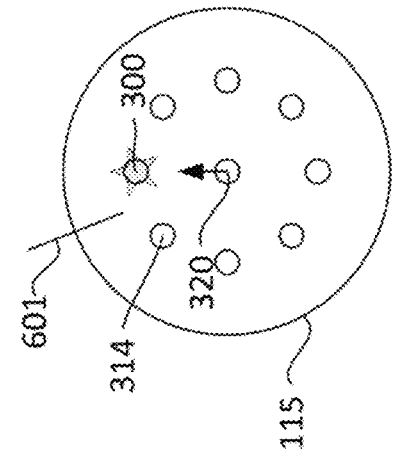

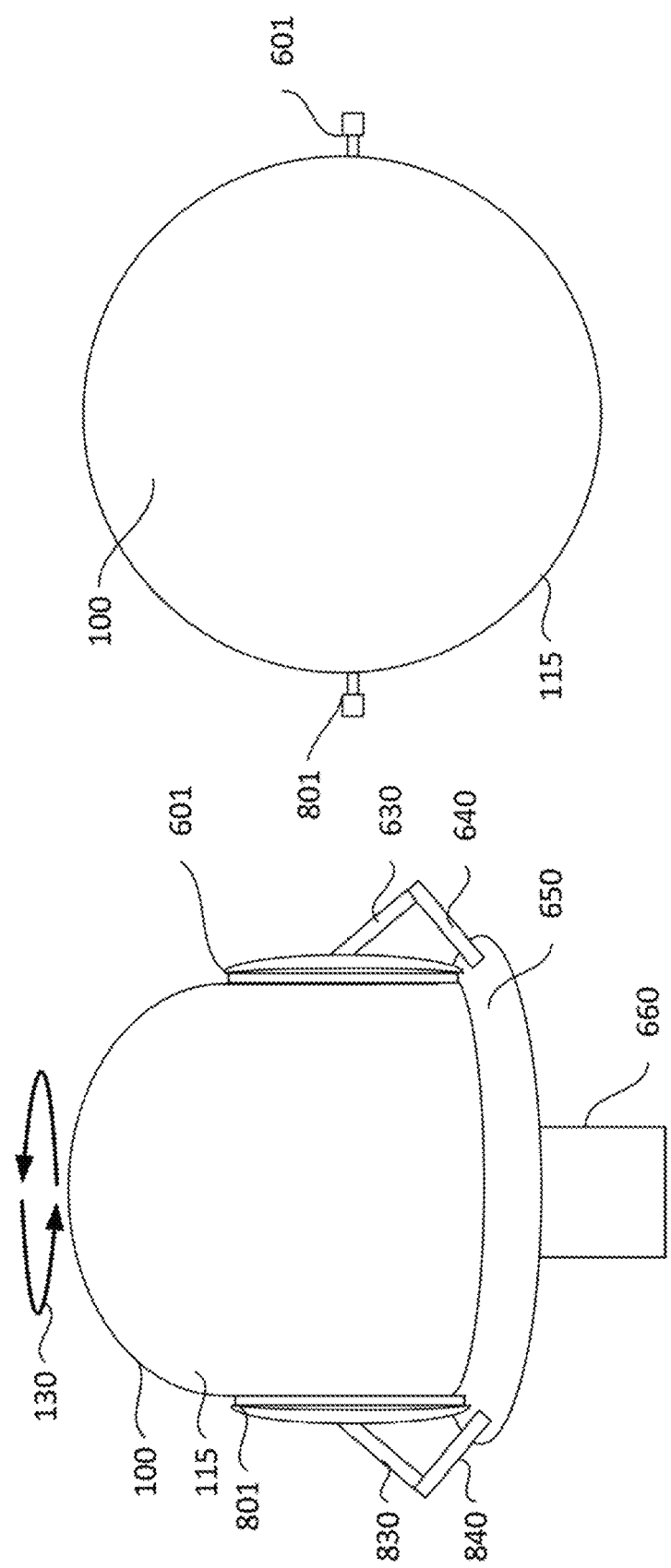

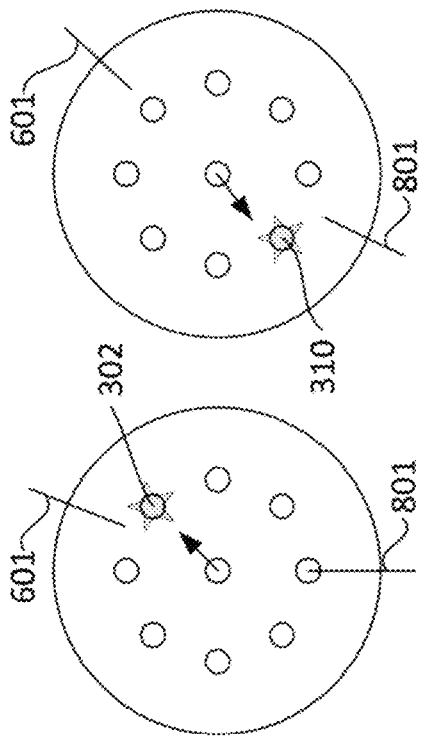
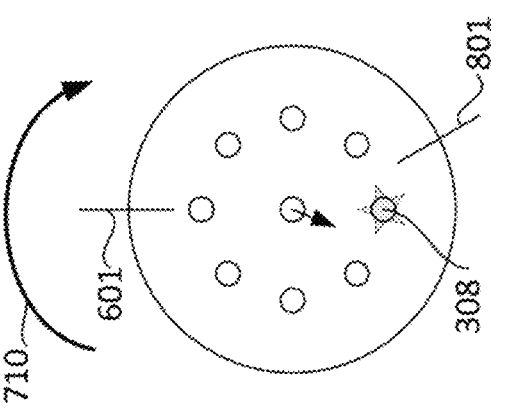
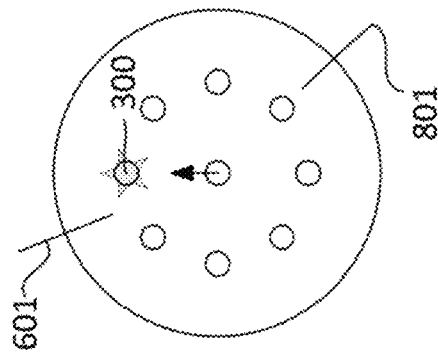
FIGURE 10D
FIGURE 10C
FIGURE 10B
FIGURE 10A

WIPER TIMING AND GEOMETRY TO MINIMIZE SENSOR OCCLUSION

CROSS-REFERENCE TO RELATED APPLICATIONS

The present application is a continuation of U.S. patent application Ser. No. 17/953,961, filed Sep. 27, 2022, which is a divisional of U.S. patent application Ser. No. 16/781,126, filed Feb. 4, 2020, now U.S. Pat. No. 11,485,328, issued Nov. 1, 2022, which is a continuation of U.S. patent application Ser. No. 15/784,944, filed Oct. 16, 2017, now U.S. Pat. No. 10,589,726, issued Mar. 17, 2020, the entire disclosures of which are each incorporated herein by reference.

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include such LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, etc., which can cause a buildup of debris and contaminants on these sensors. Typically, the sensors include a cover to protect the internal sensor components of the sensors from the debris and contaminants, but over time, the cover itself may become dirty. As such, the functions of the sensor components may be impeded as signals transmitted and received by the internal sensor components are blocked by the debris and contaminants.

SUMMARY

Embodiments within the disclosure generally relate to clearing vehicle sensors of debris and contaminants. One aspect includes a system for clearing a sensor cover. The system comprising a first wiper and second wiper configured to clear the sensor cover of debris and a motor for rotating the first wiper and the second wiper in a first direction at a first predetermined rotation rate defined at least in part by a second predetermined rotation rate of a first sensor arranged within the sensor cover. The first wiper and the second wiper may be offset by a predetermined angular distance relative to a center of the sensor cover.

In some instances the first predetermined rotation rate is further defined by a total number of a plurality of second sensors, the second sensors being fixed relative to the sensor cover. The predetermined angular distance apart may be between 150 and 170 degrees when the total number is 8.

In some instances the system comprises the plurality of second sensors. The plurality of second sensors may be cameras.

In some instances system may further comprise the first sensor, and wherein first sensor may be configured to rotate in a second direction at the second predetermined rotation rate.

In some instances the first predetermined rotation rate is further defined by the number of spaces between the plurality of second sensors the first or second wiper will advance per cycle where a cycle is the difference between the first or second wiper position and a position of the first sensor repeats with some periodicity. In some instances the first predetermined rotation rate is further defined by dividing the number of spaces between the plurality of second sensors by a number of spaces between the plurality of second sensors the first sensor will advance per cycle. In some instances the first predetermined rotation rate is the result of the dividing, multiplied by the second predetermined rotation rate of the first sensor.

In some instances the first predetermined rotation rate is defined by wiper_advances_per_cycle/sensor_advances_per_cycle*f_sensor_rotation, where wiper_advances_per_cycle is the number of spaces between the cameras the first or second wiper will advance per cycle, f_sensor_rotation is the second predefined rotation rate, and sensor_advances_per_cycle is the number of spaces between the plurality of second sensors the first sensor will advance per cycle where a cycle is the difference between the first or second wiper position and a position of the first sensor repeats with some periodicity. In some instances sensor_advances_per_cycle is defined in part by the number of secondary sensors multiplied by the number of rotations the first sensor rotates per cycle. In some instances sensor_advances_per_cycle is further defined in part by the wiper_advances_per_cycle multiplied by a wiper direction value, where the wiper direction value is 1 when the first and second wipers rotate in the same direction as the first sensor and −1 when the first and second wipers rotate in the opposite direction as the first sensor.

In some instances sensor_advances_per_cycle is defined by sensor_rotations_per_cycle*num_sensors+wiper_direction*wiper_advances_per_cycle, where num_sensors is the number of secondary sensors, wiper_direction is 1 when the first and second wipers rotate in the same direction as the first sensor and −1 when the first and second wipers rotate in the opposite direction as the first sensor, and sensor_rotations_per_cycle is the number of rotations the first sensor rotates per cycle.

In some instances the predetermined angular distance is defined by the total number of a plurality of second sensors and which second sensors the wipers should be between during the first rotation of a first sensor.

In some instances the predetermined angular distance is further defined by the rotation rate of the first sensor and a rotation rate and direction of the first and second wipers.

In some instances the predetermined angular distance is further defined by ((slot_numbers+wiper_direction/2)/num_sensors*2*Π*(1.0−wiper_direction*wiper frequency/f_sensor_rotation)), where slot_numbers is an index of the position between the secondary sensors that a given wiper should be in during the first rotation of the first sensor, num_sensors is the number of secondary sensors, wiper_direction is 1 when the first and second wipers rotate in the same direction as the first sensor and −1 when the first and second wipers rotate in the opposite direction as the first sensor, f_sensor_rotation is the rotation rate of the first sensor, and wiper frequency is the first predetermined rotation rate.

In some instances the system further comprises a third wiper. The first wiper, the second wiper, and the third wiper may be offset by a predetermined angular distance relative to a center of the sensor cover.

In some instances the first and second wipers each include one or more wiper blades. In some instances the one or more wiper blades are configured to clear the sensor cover by wiping the sensor cover wiper in the first direction at the first predetermined rotation rate.

BRIEF DESCRIPTION OF THE DRAWINGS

The present technology is illustrated by way of example, and not by way of limitation, in the figures of the accompanying drawings in which like reference numerals refer to similar elements including:

FIG. 7A-7D are illustrations of the operation a sensor with a single wiper being engaged in accordance with aspects of the disclosure.

FIGS. 8A and 8B are illustrations of two wiper positioned opposite of each other being rotated around a sensor in accordance with aspects of the disclosure.

FIGS. 10A-10D are illustrations of the operation of a sensor with two wipers offset from each other being engaged in accordance with aspects of the disclosure.

DETAILED DESCRIPTION

Figure 1:
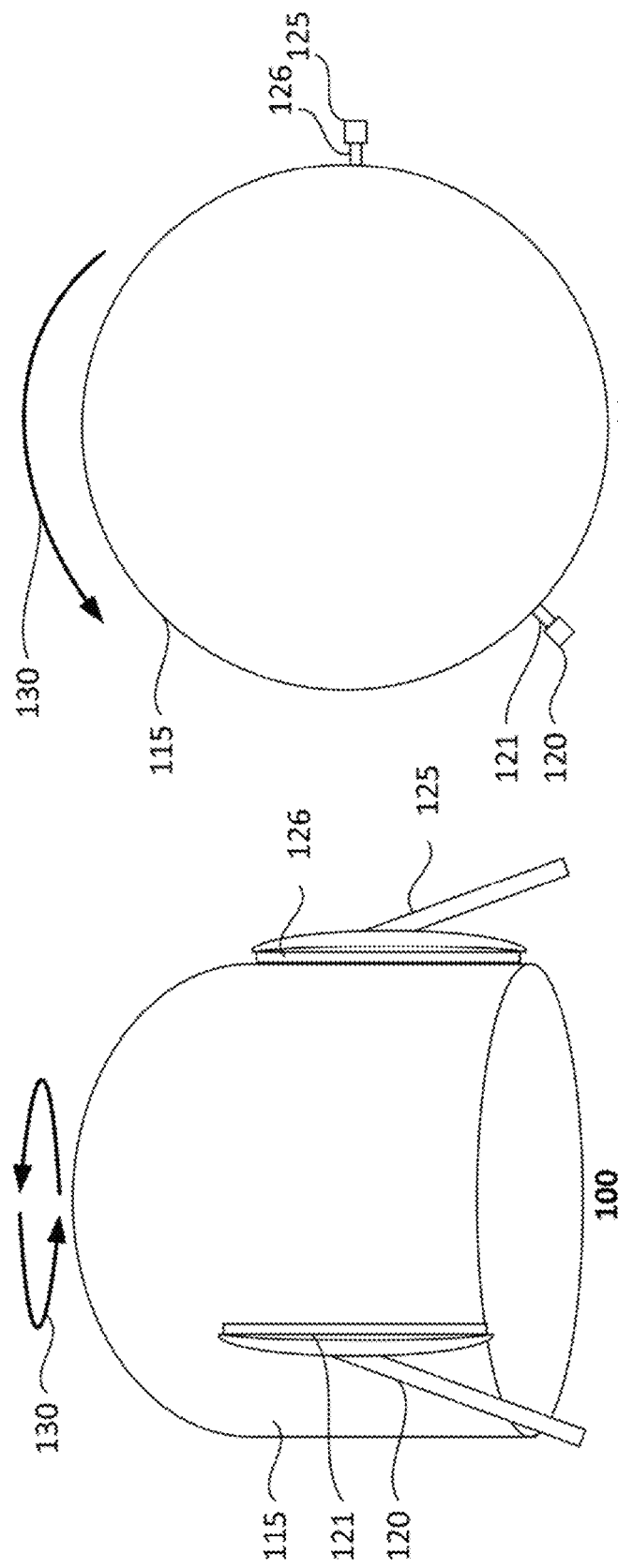
FIGS. 1A and 1B are illustrations of a sensor and wiper configuration in accordance with aspects of the disclosure.

The technology described herein relates to clearing vehicle sensors of debris and contaminants to assure adequate operation. For instance, a sensor may include a cover to protect internal sensor components from debris such as water, dirt, insects, and other contaminants, but, as noted above, the cover itself may become dirty over time. As such, the functions of the internal sensor components may be impeded as signals transmitted and received by the internal sensor components may be blocked by the debris. Debris may be cleared from a sensor by rotating two or more wipers around the sensor offset from one another by a predetermined angular distance, such that the cover is wiped clear by the wipers.

A vehicle sensor may be comprised of internal sensor components, a cover for housing the internal sensor components, and a cover window. The cover window may be constructed at a specific location on the sensor cover and the internal sensor components may transmit and receive one or more signals through the cover window.

The internal sensor components may include one or more imaging sensors, such as rotatable sensors or stationary sensors configured to capture data corresponding to the sensor's surroundings. For instance, a rotatable sensor may be configured to continually capture data while stationary sensors, such as cameras, may be configured to periodically capture image data.

The rotation rate of the wipers around the sensor may be set such that the wipers are positioned outside the field of view of the stationary sensors as they capture an image. In this regard, when only a single wiper is used, the wiper may be rotated at such as speed to locate the wiper approximately halfway between the apertures of neighboring cameras, in a part of the dome with no aperture, when the camera is imaging. However, a single wiper may not be able to clear the cover quickly enough and the use of more than one wiper spaced uniformly opposite each other may result in one of the wipers entering the field of view of a sensor as it transmits and receives data. More rapid clearing of the sensor cover may be needed than a single wiper can handle. As such, more than one wiper may be used. In this regard, additional wipers may be used in conjunction with the first wiper, and all of the wipers may be rotated around the sensor at the same rate.

The wipers should be positioned such that they are offset from each other at a predetermined angular distance relative to the center of the sensor cover. In this regard, if two wipers are positioned opposite each other relative to the center of the sensor cover, the wipers may be positioned within the field of view of a stationary sensor when the stationary sensor is capturing an image. By offsetting the wipers at a predetermined angular distance, the wipers may be consistently positioned between apertures of neighboring stationary sensors, thereby avoiding blocking a stationary sensor's field of view during its exposure duration.

The features described herein may allow for continued use of a sensor even when the sensor's cover becomes dirty. By doing such, the sensor may continue operation without interruption or the need for an individual to manually clean the sensor, as the wiper may continually and rapidly clean the sensor cover when needed. As such, the vehicle may continually operate in environments which produce a lot of debris, such as construction sites or off-road locations for road vehicles such as cars, trucks, etc. However, while certain aspects of the disclosure are particularly useful in connection with specific types of vehicles, the vehicle may be any type of vehicle including, but not limited to, cars, trucks, motorcycles, busses, boats, airplanes, helicopters, lawn mowers, recreational vehicles, amusement park vehicles, farm equipment, construction equipment, trams, golf carts, trains, and trolleys.

A vehicle sensor may be comprised of internal sensor components and a cover for housing the sensor components. For instance, FIGS. 1A and 1B are side and top-down views of a sensor 100 having a sensor cover 115 and wipers 120 and 125. As noted above, the wipers 120 and 125 may be offset from each other by a predetermined angular distance. Each of the wipers may be rotated in a direction 130 around the cover 115 of the sensor 100. As the wipers rotate around the sensor 100, the wiper blades 121 and 126, of wipers 120 and 125, respectively, may loosen, pull and push away the debris built up on the cover.

Figure 2:
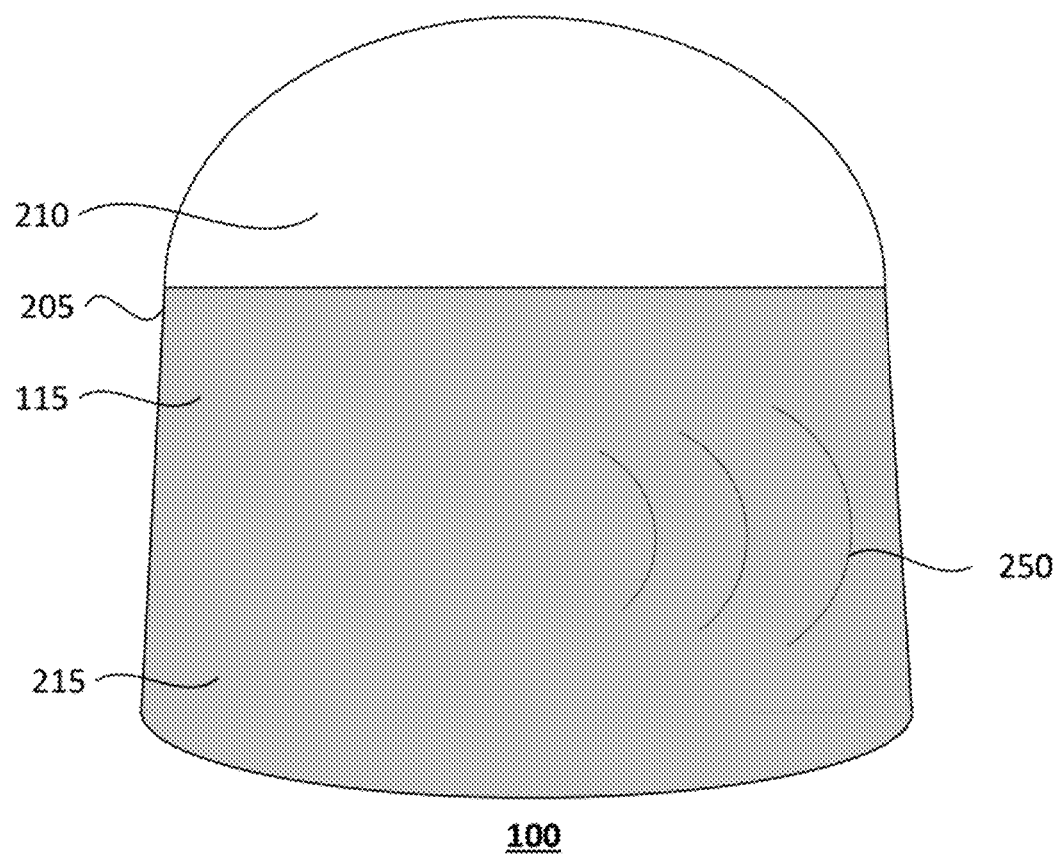
FIG. 2 shows a sensor cover window in accordance with aspects of the disclosure.

The cover of the sensor may be configured in various shapes and sizes. For instance, as shown in FIG. 2, the sensor cover 115 may be configured such that it has a domed shaped top portion 210 with a side wall 205 in the shape of a frustum. The sensor cover 115 may be comprised of materials such as plastic, glass, polycarbonate, polystyrene, acrylic, polyester, etc. The sensor may be located internally or externally from a vehicle.

The cover of the sensor may include a cover window through which the internal sensor components may transmit and receive signals. For instance, as further shown in FIG. 2, the entire side wall 205 of the sensor cover 115 may be constructed as a cover window 215, to allow signals 250 to penetrate the sensor cover 115. Although the entire side wall 205 is shown as being the cover window 215, in some instances only a portion or portions of the sidewall may be constructed as cover windows. The cover window 215 may be composed of the same, or different, material as the sensor cover 115. In some instances the entire sensor cover 115, or a large portion of the sensor cover, may be penetrable by the signals 250 transmitted and received by the internal sensor components, thereby allowing the entire sensor cover 115 to function as a cover window.

Figure 3:
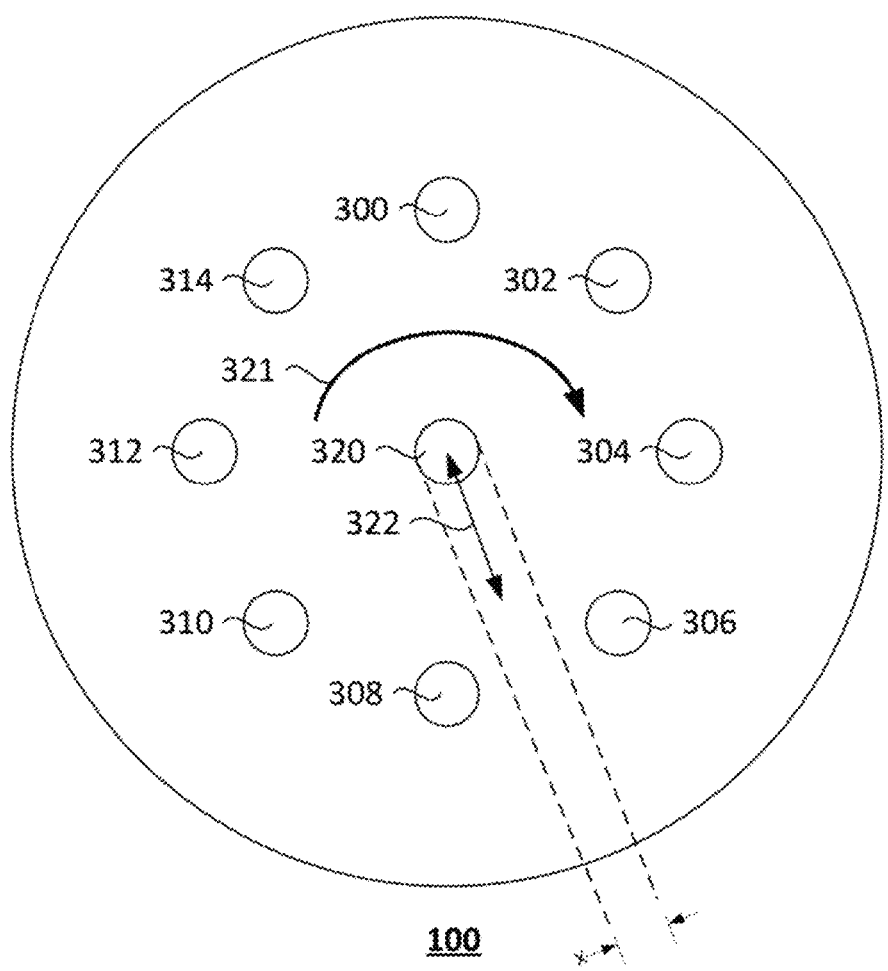
FIG. 3 shows a top down view of imaging sensors within a sensor in accordance with aspects of the disclosure.

The internal sensor components may transmit and receive one or more signals through the cover window of the sensor. In this regard, the internal sensor components may include one or more imaging sensors such as LIDAR, radar, sonar, camera, or other such imaging sensors positioned within the cover of the sensor. For instance, as shown in the top down view of a sensor in FIG. 3, the internal sensor components may include eight stationary sensors, such as cameras 300-314 in a ring formation, spaced 45 degrees apart in the azimuth, and a rotatable sensor, such as a LIDAR 320, positioned in the center of the sensor 100. The LIDAR 320 may be positioned above or below the cameras 300-314. Although a single LIDAR 320 and eight cameras 300-314 are shown as being within the sensor 100, any number and combination of sensors may be used.

The rotatable sensor may be configured to continually capture portions of the sensor's surroundings. In this regard, the rotatable sensor may be configured to rotate at a predetermined rate and capture a range of the sensor's surroundings. For instance, referring to the example of FIG. 3, the LIDAR 320 may be configured to rotate a speed of 10 Hz, or more or less, in a direction 321. As the LIDAR 320 rotates, the LIDAR may continually transmit and receive signals 322 to capture image data corresponding to a degree range X, of its surroundings. This degree range X may be about 10 degrees, or more or less.

Figure 4:
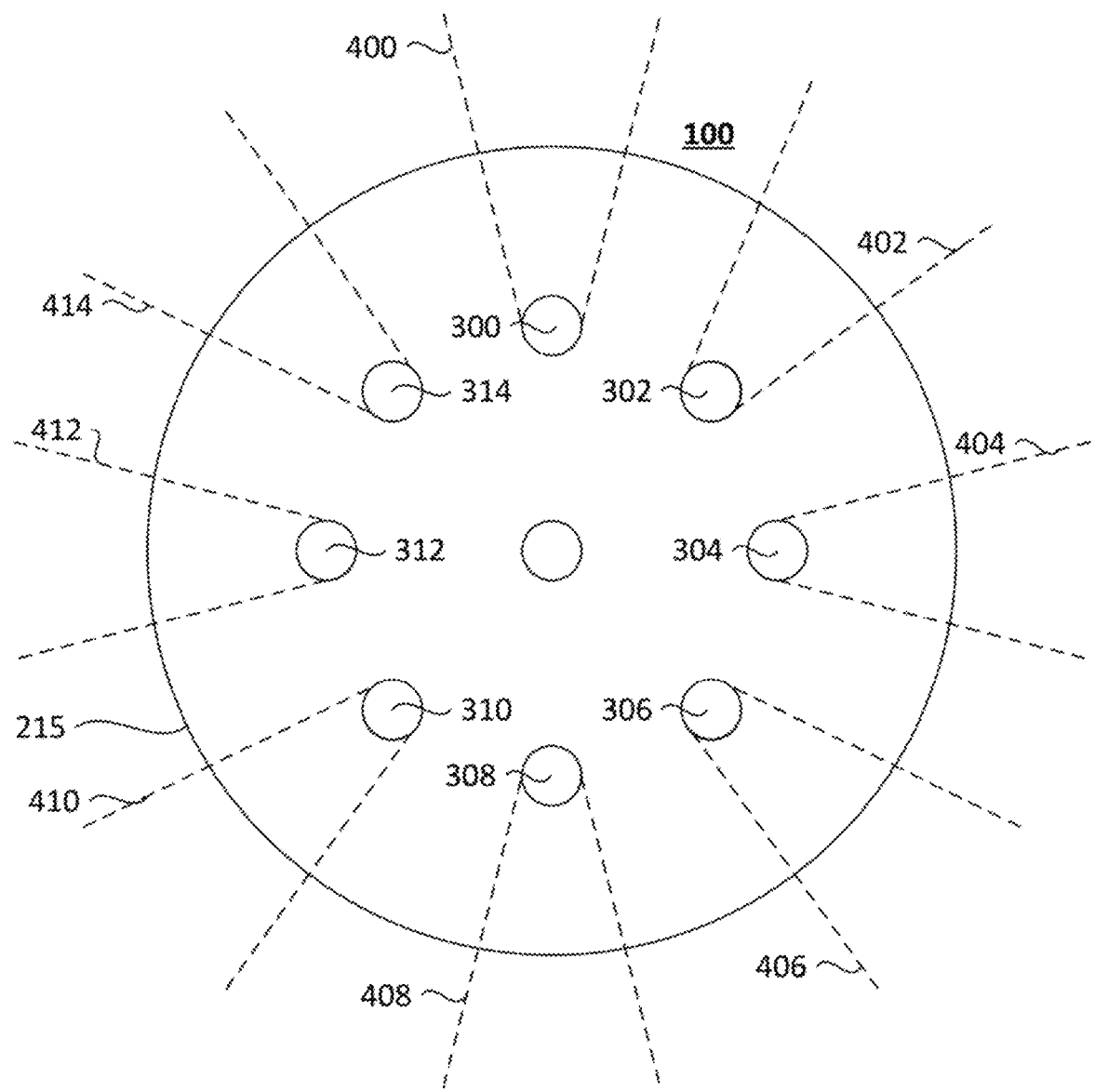
FIG. 4 is an illustration of field of views for cameras within the sensor in accordance the disclosure.

The cameras may be configured to capture image frames which include data corresponding to the sensor's surroundings. For instance, as shown in FIG. 4, each camera 300-314 may have a field of view 400-414, respectively, within which it captures image frames. In order to capture a full image frame, each camera may require 3 cm, or more or less, of unimpeded space on the cover window corresponding to the respective camera's field of view.

The angle and orientation of each camera may be positioned to eliminate blind spots. In this regard, the positioning of the cameras may be such that their respective fields of views form a cohesive, 360-degree field of view of the vehicle's surroundings when combined. In certain instances, the cameras may be calibrated and tested to confirm that the cameras are performing as expected and/or to provide data, such as image data, which can be analyzed to improve the design and features of the cameras. For instance, the cameras 300-314 may be calibrated and tested to assure they are providing a full 360 degree field of view of the vehicle's surroundings.

Figure 5:
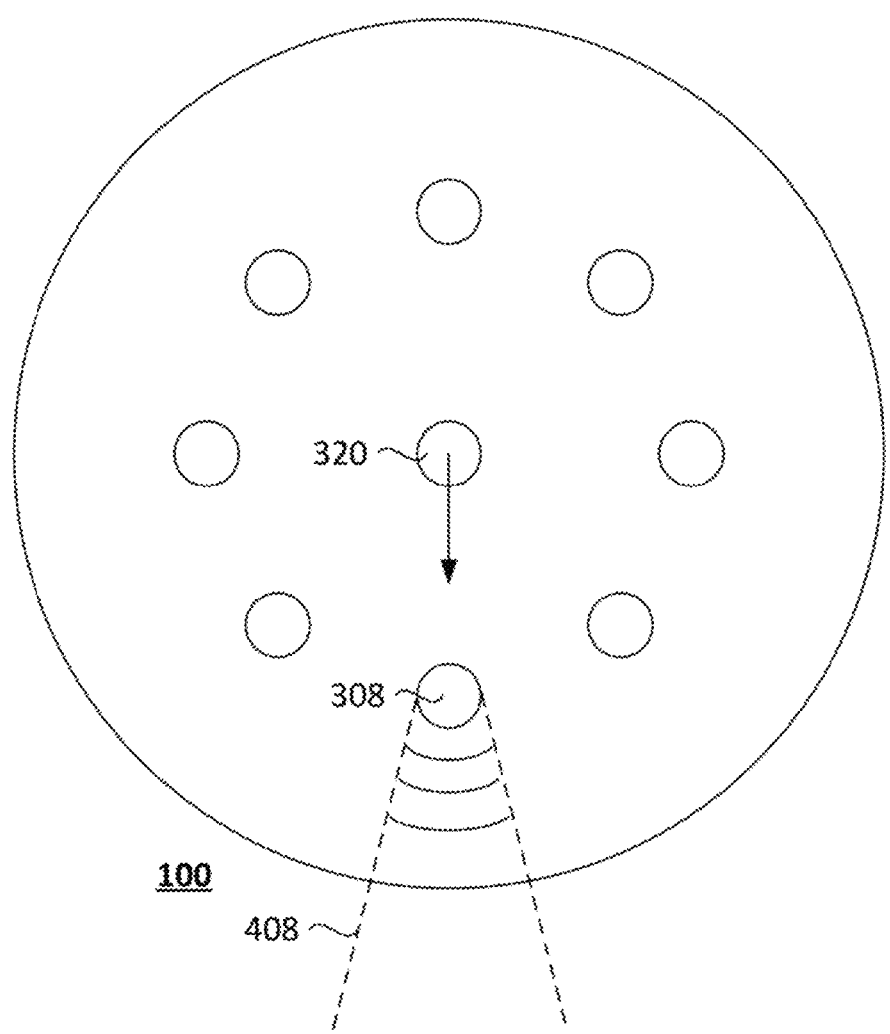
FIG. 5 is an illustration of a camera capturing a frame in accordance with aspects of the disclosure.

Each camera may be configured to capture a frame of data upon the rotatable sensor aligning with the field of view of the respective camera. Continuing the example of the LIDAR 320 rotating at 10 Hz, each camera's field of view may align with the LIDAR every 100 ms. As such, each camera may capture a frame every 100 ms. For instance, as shown in FIG. 5, upon the LIDAR 320 aligning with camera 308, such as with the center of the camera's field of view, the camera 308 may capture a frame of image data within its field of view 408. In some instances, each camera will have exposure duration plus read time that is a small duration of the time between frames (i.e., less than 100 ms). Thus, each camera may be inactive (i.e., not capturing an image) for a period of time, such as more than half the duration of the time between frames.

Figure 6:
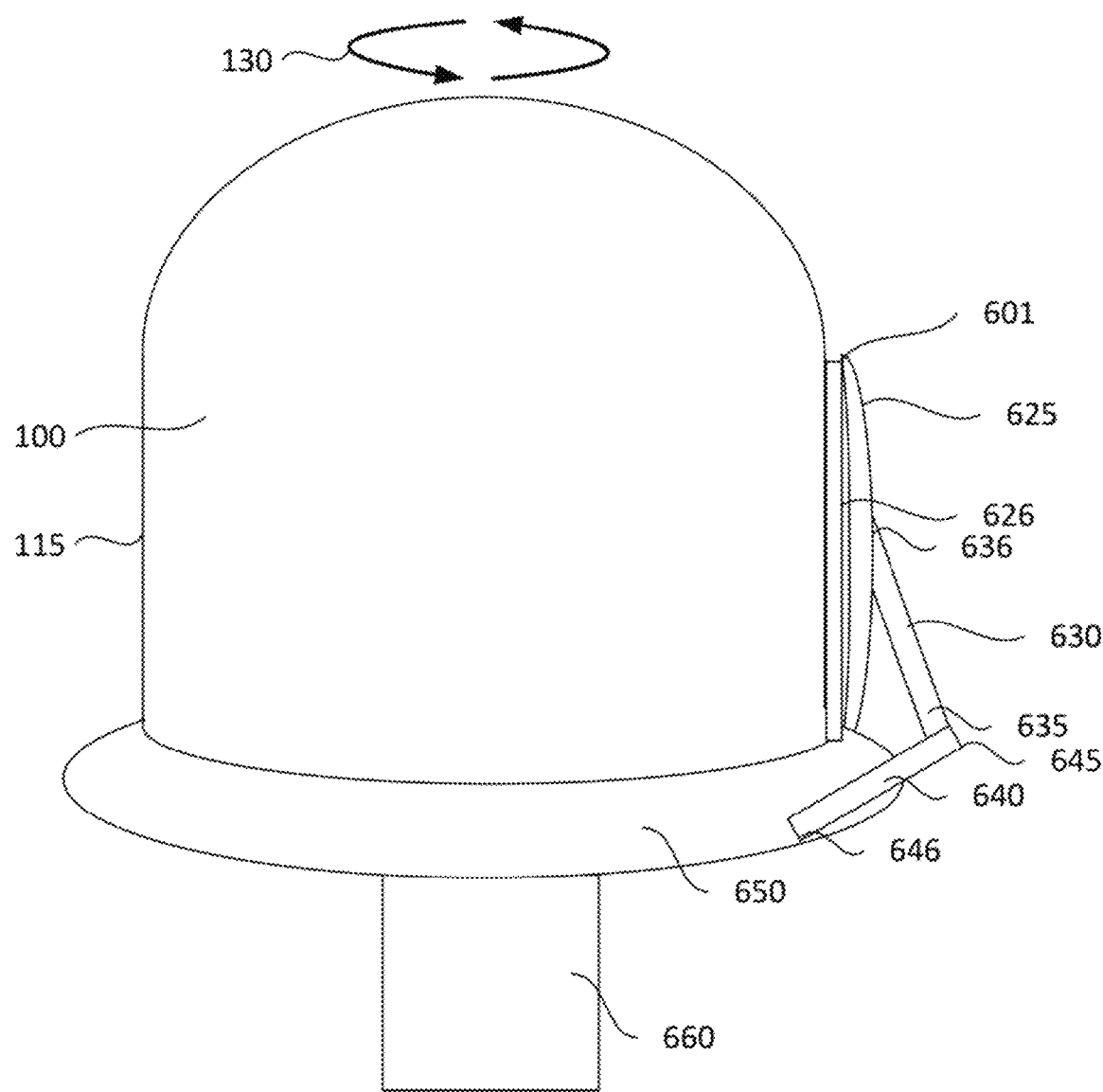
FIG. 6 is an illustration of a wiper being rotated around a sensor in accordance with aspects of the disclosure.

The one or more wipers may be comprised of a wiper blade, a wiper support, and a wiper arm. For instance, referring to FIG. 6, a single wiper 601 is shown having a 10 mm wide blade 626, or more or less, constructed from a linear piece of material which is attached to the wiper support 625. The wiper blade 626 may be comprised of materials capable of removing debris, such as, such as rubber (e.g., buna, ethylene propylene diene monomer (EPDM), silicone, etc.) or plastic (urethane, polyethylene, etc.). The wiper blade 626 may also be comprised of a solid or sponge-like foam or fabric (e.g. woven fabric, felted fabric, etc.). In some embodiments a wiper may include multiple wiper blades.

The wipers may be attached to a motor. In this regard, a wiper arm may be attached directly to a motor or to a motor via a bearing ring that rotates around the base of the dome. For instance, as further shown in FIG. 6, a first end of a wiper arm 635 may be attached to a first end 645 of a shaft 640 and the opposite end 646 of the shaft 640 may be connected to a bearing ring 650. The second end of the wiper arm 636 may be attached to the wiper support 625. The bearing ring may be rotated by a motor 660. The motor may rotate the bearing ring and accordingly the shaft 640 and wiper arm 630 in the first direction 130 causing the wiper 601 to also rotate around the sensor cover 115, as further shown in FIG. 6. The wipers may be rotated in the same direction or a different direction than the rotatable sensor 320 (not shown).

The rotation rate of the wiper rotating around the sensor cover may be set such that the wiper is positioned outside the field of view of a camera as the camera captures an image. In this regard, when only a single wiper, such as wiper 601 is used, the wiper 601 may be rotated at such as speed to locate the wiper approximately halfway between the apertures of neighboring cameras, in a part of the dome with no aperture, when the camera is imaging. The rotation rate of the wiper may be determined using the following Formula (1): wiper_advances_per_cycle/sensor_advances_per_cycle*f_sensor_rotation, where wiper_advances_per_cycle is the number of cameras separations (i.e., the spaces between the cameras,) a wiper will advance per cycle, f_sensor_rotation is the rotation rate of the rotatable sensor, and sensor_advances_per_cycle is defined by Formula (2): sensor_rotations_per_cycle*num_sensors+wiper_direction*wiper_advances_per_cycle, where num_sensors is the number of stationary sensors, wiper_direction is 1 when the wiper rotates in the same direction as the rotatable sensor and −1 when the wiper rotates in the opposite direction as the rotatable sensor, and sensor_rotations_per_cycle is the number of rotations the rotatable sensor rotates every cycle, where a cycle is the difference between wiper position and rotatable sensor position repeats with some periodicity. For instance, the rotatable sensor may rotate one full rotation plus one slot while the wiper rotates one slot in a cycle. A slot is the area between stationary sensors.

In some instances, upon determining to wipe the sensor, the rotation of the wiper may be delayed until the location of the LIDAR is at a starting location relative to the wiper blades. In this regard, the wiper may transition from standstill to the desired wiping speed while minimizing interference of any imaging cameras while the wiper rotation begins. The starting location may be determined such that when the wiper begins to move, but before reaching the desired rotation rate, the error between the desired azimuth and their actual azimuth of the wiper relative to the LIDAR and imaging cameras is minimized. For more than one wiper, the starting location for each wiper relative to the LIDAR and imaging cameras may be different.

FIGS. 7A-7D show an example of a single wiper rotating around the sensor cover such that it is positioned outside the field of view of the cameras as the cameras capture images. Turning first to FIG. 7A, LIDAR 320 is initially directed towards camera 300 and wiper 601 is positioned on the sensor cover 115 such that it is in the slot between cameras 300 and 314. Upon starting up, the LIDAR 320 and cameras may begin to capture data immediately. In this regard, since LIDAR 320 is aligned with camera 300, camera 300 may capture an image, as illustrated by the star in FIG. 7A. For clarity, not all of the cameras are labeled in FIGS. 7A-7D. As described in Formula (1), the wiper may also be configured to rotate in the opposite direction of the rotatable sensor.

As the LIDAR 320 rotates, for instance at a speed of 10 Hz, in a first direction 710, the wiper 601 may begin to rotate in the direction 710 as well. In this regard, since there are 8 cameras (i.e., stationary sensors) situated in the sensor and configured as described above, the wiper 601 may rotate at a speed of 1.11 Hz, in accordance with Formula (1). By rotating at a speed of 1.11 Hz, the wiper 301 is positioned between apertures of neighboring cameras when a camera is imaging. For example, FIGS. 7B-7D show the wiper 601 continuing to rotate in a direction 710 as the LIDAR 320 rotates. Upon the LIDAR 320 aligning with a camera, such as camera 302, in FIG. 7C the wiper may be positioned in a slot between cameras 300 and 302, such that the wiper is outside the field of view of camera 302 as it captures an image.

To provide more rapid clearing of the sensor cover the speed of the rotation of the wiper may be increased. For instance, the rotation of the wiper may be increased to 2 Hz. However, as the speed of the wiper increases to a certain point, the operation of the wiper may be compromised as centripetal forces may result in the contact force of the wiper on the sensor cover decreasing. Moreover, the longevity of the wiper may be decreased as the rotation speed is increased, since the wiper blade may wear out more quickly. As such, more than one wiper may be used.

For instance, a second wiper 801 may be used in conjunction with the first wiper 601, as shown in FIGS. 8A and 8B. The motor 660 may rotate bearing ring 650, which in turn, may rotate wiper shafts 640 and 840 and wiper arms 630 and 830 of the first wiper 601 and wiper 801, respectively in a first direction 130. The wipers may therefore move in the same direction at the same speed, thereby increasing the clearing speed of the sensor cover 115 relative to a single wiper rotated at the same speed.

Figure 9D:
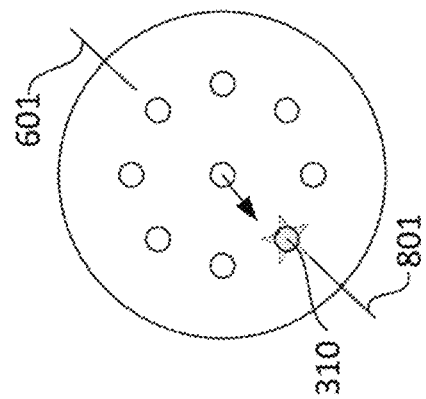
FIGS. 9A-9D are illustrations of the operation of a sensor with two wipers positioned opposite of each other being engaged in accordance with aspects of the disclosure.
Figure 9C:
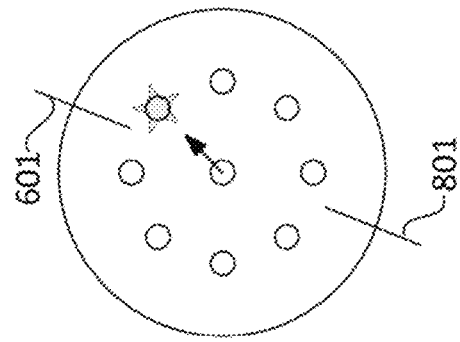
Figure 9B:
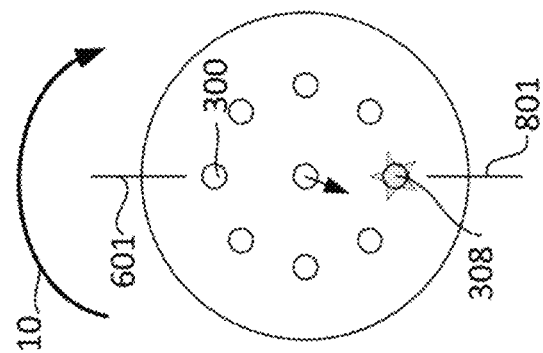
Figure 9A:
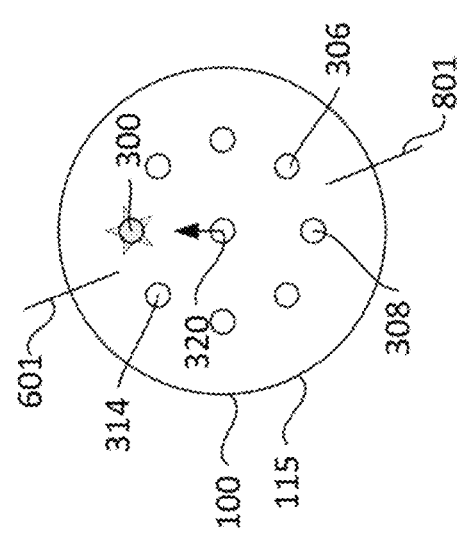

However, when the second wiper 801 is positioned at 180 degrees apart from the first wiper 601, as shown in FIGS. 9A-9D, the second wiper 801 may obstruct a camera's field of view during its exposure duration. Turning first to FIG. 9A, LIDAR 320 is initially directed towards camera 300, wiper 601 is positioned on the sensor cover 115 such that it is in the slot between cameras 300 and 314, and wiper 801 is positioned in the slot between cameras 306 and 308. Upon starting up, the LIDAR 320 and cameras may begin to capture data immediately. In this regard, since LIDAR 320 is aligned with camera 300, camera 300 may capture an image, as illustrated by the star in FIG. 9A.

As the LIDAR 320 rotates at a speed of 10 Hz, in the first direction 710, the wipers 601 and 801 may begin to rotate in the direction 710 as well. In this regard, since there are 8 cameras (i.e., stationary sensors) situated in the sensor and configured as described above, the wipers 601 and 801 may rotate at a speed of 1.11 Hz, in accordance with Formula (1). By rotating at a speed of 1.11 Hz, the wiper 601 is positioned at camera 300 when camera 308 is imaging. However, wiper 801 may be positioned in front of camera 308 as the camera captures an image, thereby obstructing the camera's field of view, as shown in FIG. 9B. As the sensor continues operation, both wipers may be positioned outside the field of view at certain times, as illustrated by FIG. 9C, however wiper 801 may again obstruct the field of view of camera 310, as camera 310 captures an image as shown in FIG. 9D.

The second wiper may be offset from the first wiper at a predetermined angular distance relative to the center of the sensor cover to prevent the second wiper from being positioned in the field of view of a stationary sensor when the stationary sensor is capturing an image. In this regard, the offset of the second wiper to the first wiper may be determined using the following Formula (3): ((slot_numbers+ wiper_direction/2)/num_sensors*2*Π*(1.0 wiper_direction*wiper frequency/f_sensor_rotation)), where slot_numbers is an index of the position between cameras that a given wiper should be in during the first rotation of the rotatable sensor. For instance, as further shown in FIG. 9, there may be eight slots between the eight cameras. Formula (3) may be used for more than two wipers.

Using Formula (3), the two wipers 601 and 801 may be positioned 160 degrees apart, as shown in FIGS. 10A-10D. Continuing the example of the LIDAR rotating at 10 Hz, each of the two wipers 601 and 801 may be rotated in direction 710 at a rate of 1.11 Hz, as further shown in FIGS. 10A-10D. Accordingly, each wiper is positioned outside the field of view of any imaging cameras, such as cameras 300, 308, 302, and 310 in FIGS. 10A-10D, respectively.

Figure 11:
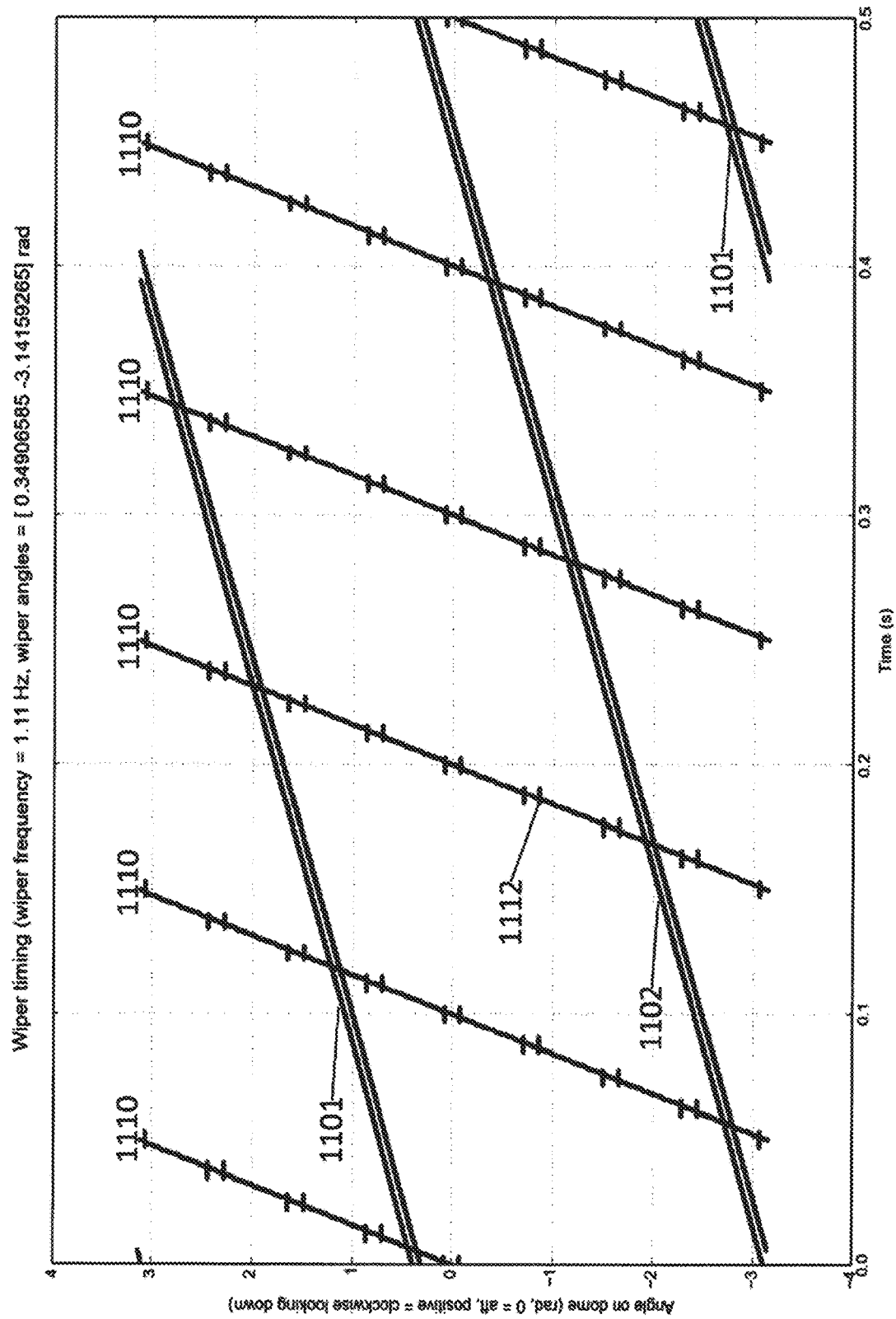
FIG. 11 shows a plot of two offset wipers on a sensor cover over a period of time relative to a position of the sensor cover at which cameras are imaging.

FIG. 11 shows a plot 1100 of two offset wipers on the sensor cover over a period of time relative to the position of the sensor cover at which the cameras are imaging. In this regard, the wipers may be rotated at a speed of 1.11 Hz and offset 160 degrees apart. Lines 1101 and 1102 represent the path of the wipers around a sensor cover over a period of time. Lines 1110 represent the direction the rotatable sensor is positioned over the period of time and marks 1112 represent locations on the sensor cover where images are being captured by stationary sensors at particular times. As can be seen from plot 1100, the two offset wipers are never positioned at locations which would obstruct a camera where images are being captured by that camera. For clarity, not all locations on the cover sensor cover where images are being captured are labeled.

Figure 12:
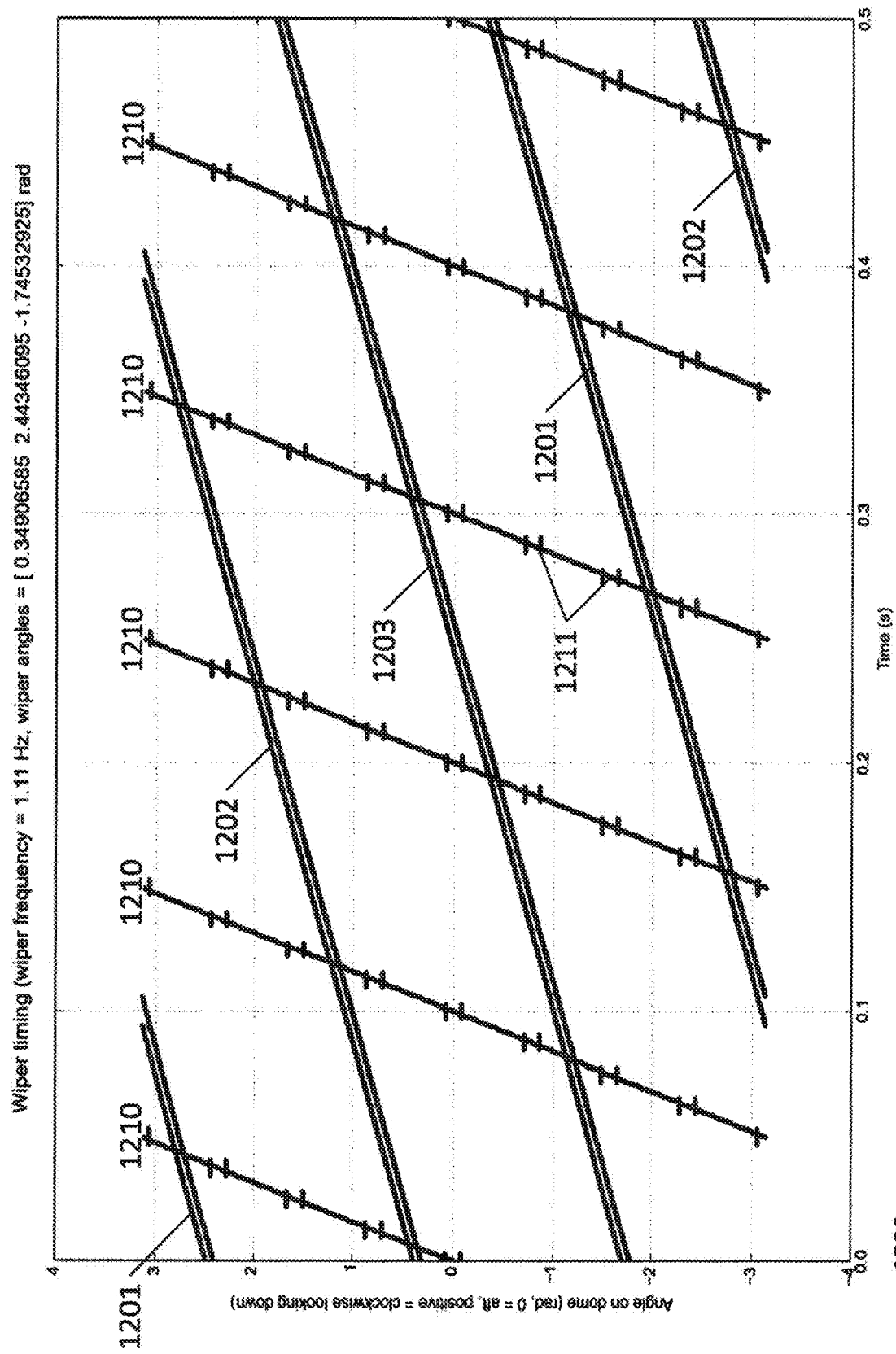
FIG. 12 shows a plot of three offset wipers on a sensor cover over a period of time relative to a position of the sensor cover at which cameras are imaging

Similarly, FIG. 12 shows a plot 1200 of three wipers 1201, 1202, and 1203 rotating at a speed of 1.11 Hz on a sensor cover over a period of time relative to the position of the sensor cover at which the cameras are imaging. Lines 1210 represent the direction the rotatable sensor is positioned over the period of time and marks 1211 represent locations on the sensor cover where images are being captured by stationary sensors at particular times. As can be seen from plot 1200, the three offset wipers are never positioned at locations which would obstruct a camera where images are being captured by that camera. For clarity, not all locations on the cover sensor cover where images are being captured are labeled, nor are all lines representing the direction the rotatable sensor is positioned label.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for operating a wiper system, the method comprising:
   determining, based on information related to a field of view of one or more cameras, a rotation rate of one or more wipers of the wiper system; and
   rotating the one or more wipers at the rotation rate such that the one or more wipers are not in the field of view of the one or more cameras while the one or more cameras are imaging.

2. The method of claim 1, wherein the rotation rate is further determined based on a total number of the one or more cameras.

3. The method of claim 1, wherein the rotation rate is further determined based on a second rotation rate of a first sensor arranged within the sensor cover.

4. The method of claim 3, wherein the first sensor rotates in a first direction, and the one or more wipers are rotated in a second direction opposite of the first direction.

5. The method of claim 1, wherein the rotation rate is further determined based on a number of spaces between the one or more cameras that a first wiper of the one or more wipers will advance per cycle, where a cycle is a difference between a first wiper position and a position of a rotating sensor that repeats with some periodicity.

6. The method of claim 5, wherein the rotation rate is further determined by dividing the number of spaces between the one or more cameras that the first wiper will advance per cycle by a number of spaces between the one or more cameras that the rotating sensor will advance per cycle.

7. The method of claim 6, wherein the rotation rate is a result of the dividing multiplied by a rotation rate of the rotating sensor.

8. The method of claim 1, wherein the information for the one or more cameras includes a number of the one or more cameras and a number of spaces between the one or more cameras.

9. The method of claim 1, wherein the information for the one or more cameras includes the field of view of the one or more cameras.

10. A system for operating a wiper system, the system comprising:
    a sensor cover;
    one or more cameras; and
    one or more wipers,
    wherein the wiper system is configured to:
       determine a rotation rate for the one or more wipers based on information related to a field of view of the one or more cameras;
       cause the one or more wipers to rotate at the rotation rate such that the one or more wipers are not in the field of view of the one or more cameras while the one or more cameras are imaging.

11. The system of claim 10, wherein the rotation rate is based on a total number of the one or more cameras.

12. The system of claim 10, wherein the rotation rate is based on a second rotation rate of a first sensor arranged within the sensor cover.

13. The system of claim 12, wherein a first sensor is configured to rotate in a first direction, and the one or more wipers are configured to rotate in a second direction opposite of the first direction.

14. The system of claim 10, wherein the rotation rate is based on a number of spaces between the one or more cameras that a first wiper of the one or more wipers will advance per cycle, where a cycle is a difference between a first wiper position and a position of a rotating sensor that repeats with some periodicity.

15. The system of claim 14, wherein the rotation rate is based on dividing the number of spaces between the one or more cameras that the first wiper will advance per cycle by a number of spaces between the one or more cameras that the rotating sensor will advance per cycle.

16. The system of claim 15, wherein the rotation rate is a result of the dividing multiplied by a rotation rate of the rotating sensor.

17. The system of claim 10, wherein the information for the one or more cameras includes a number of the one or more cameras and a number of spaces between the one or more cameras.

18. The system of claim 10, wherein the information for the one or more cameras includes the field of view of the one or more cameras.

* * * * *